United States Patent
Heo et al.

(10) Patent No.: US 10,721,479 B2
(45) Date of Patent: Jul. 21, 2020

(54) INTRA PREDICTION METHOD AND APPARATUS IN IMAGE CODING SYSTEM

(71) Applicant: LG ELECTRONICS INC., Seoul (KR)

(72) Inventors: Jin Heo, Seoul (KR); Hyeongmoon Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/336,830

(22) PCT Filed: Aug. 31, 2017

(86) PCT No.: PCT/KR2017/009540
§ 371 (c)(1),
(2) Date: Mar. 26, 2019

(87) PCT Pub. No.: WO2018/062702
PCT Pub. Date: Apr. 5, 2018

(65) Prior Publication Data
US 2019/0273926 A1    Sep. 5, 2019

Related U.S. Application Data

(60) Provisional application No. 62/401,897, filed on Sep. 30, 2016.

(51) Int. Cl.
*H04N 19/159*    (2014.01)
*H04N 19/105*    (2014.01)
(Continued)

(52) U.S. Cl.
CPC ......... *H04N 19/159* (2014.11); *H04N 19/105* (2014.11); *H04N 19/176* (2014.11); *H04N 19/593* (2014.11); *H04N 19/91* (2014.11)

(58) Field of Classification Search
CPC .... H04N 19/159; H04N 19/91; H04N 19/176; H04N 19/105
See application file for complete search history.

(56) References Cited

U.S. PATENT DOCUMENTS

2010/0128995 A1* 5/2010 Drugeon .............. H04N 19/176
382/238
2013/0251036 A1* 9/2013 Lee ...................... H04N 19/593
375/240.12
(Continued)

FOREIGN PATENT DOCUMENTS

JP    2014-131265 A    7/2014
KR    10-2012-0014947 A    2/2012
(Continued)

*Primary Examiner* — Shawn S An
(74) *Attorney, Agent, or Firm* — Dentons US LLP

(57) ABSTRACT

The intra prediction method according to the present invention comprises the steps of: deriving an intra prediction mode of a current block; deriving neighboring reference samples of the current block; and generating a prediction sample of the current block on the basis of linear interpolation of a first neighboring reference sample positioned in the prediction direction of the intra prediction mode, and a second neighboring reference sample positioned in the opposite direction of the prediction direction, among the neighboring reference samples of the current block, wherein the neighboring reference samples include left neighboring reference samples, left upper neighboring reference samples, upper neighboring reference samples, right neighboring reference samples, right lower neighboring reference samples, and lower neighboring reference samples of the current block. The present invention can improve intra prediction performance, and thereby reduce the amount of data required for residual information and increase the overall coding efficiency.

17 Claims, 13 Drawing Sheets

(51) Int. Cl.
*H04N 19/176* (2014.01)
*H04N 19/91* (2014.01)
*H04N 19/593* (2014.01)

(56) References Cited

U.S. PATENT DOCUMENTS

| | | | | |
|---|---|---|---|---|
| 2013/0301720 A1* | 11/2013 | Lee | ............ | H04N 19/157 |
| | | | | 375/240.12 |
| 2014/0185672 A1* | 7/2014 | Terada | ............ | H04N 19/30 |
| | | | | 375/240.12 |
| 2015/0016516 A1* | 1/2015 | Saxena | ............ | H04N 19/182 |
| | | | | 375/240.12 |
| 2015/0288980 A1* | 10/2015 | Lee | ............ | H04N 19/13 |
| | | | | 375/240.16 |

FOREIGN PATENT DOCUMENTS

| KR | 10-2015-0008405 A | 1/2015 |
|---|---|---|
| KR | 10-2015-0059146 A | 5/2015 |
| KR | 10-1579356 B1 | 12/2015 |

\* cited by examiner (b)

(a)

(b) Quad tree binary tree block structure

—— Quad tree structure
- - - Binary tree structure (a) (a) Quad tree block structure

INTRA PREDICTION METHOD AND APPARATUS IN IMAGE CODING SYSTEM

CROSS-REFERENCE TO RELATED APPLICATIONS

This application is the National Stage filing under 35 U.S.C. 371 of International Application No. PCT/KR2017/009540, filed on Aug. 31, 2017, which claims the benefit of U.S. Provisional Application No. 62/401,897 filed on Sep. 30, 2016, the contents of which are all hereby incorporated by reference herein in their entirety.

BACKGROUND OF THE INVENTION

Field of the Invention

The present invention relates to an image coding technology, and more particularly, to an intra-prediction method and apparatus in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high-quality images.

SUMMARY OF THE INVENTION

It is technical object of the present invention to provide a method and apparatus for improving image coding efficiency.

It is another technical object of the present invention to provide a method and an apparatus for improving prediction performance.

It is another technical object of the present invention to provide a method and apparatus for improving intra-prediction performance.

It is another technical object of the present invention to provide a method for improving the intra-prediction performance while reducing data amount of additional information.

According to an embodiment of the present invention, a method of encoding an image by an encoding apparatus. The method comprises the steps of: determining an intra-prediction mode for a current block; deriving neighboring reference samples of the current block; generating a prediction sample of the current block based on linear interpolation of a first neighboring reference sample located along the prediction direction of the intra-prediction mode, and a second neighboring reference sample located along the opposite direction of the prediction direction, among the neighboring reference samples of the current block; generating a residual sample for the current block based on the prediction sample; and encoding prediction mode information for the intra-prediction mode and residual information for the residual sample and outputting the same, wherein the neighboring reference samples include left neighboring reference samples, upper-left neighboring reference samples, upper neighboring reference samples, right neighboring reference samples, lower-right neighboring reference samples, and lower neighboring reference samples of the current block.

According to another embodiment of the present invention, an encoding apparatus of performing encoding an image is provided. The encoding apparatus comprises a prediction unit configured to determine an intra-prediction mode for a current block, derive neighboring reference samples of the current block, and generate a prediction sample of the current block based on linear interpolation of a first neighboring reference sample located along the prediction direction of the intra-prediction mode, and a second neighboring reference sample located along the opposite direction of the prediction direction, among the neighboring reference samples of the current block; a residual processor configured to generate a residual sample for the current block based on the prediction sample; and entropy encoding unit configured to encode prediction mode information for the intra-prediction mode and residual information for the residual sample and output the same, wherein the neighboring reference samples include left neighboring reference samples, upper-left neighboring reference samples, upper neighboring reference samples, right neighboring reference samples, lower-right neighboring reference samples, and lower neighboring reference samples of the current block.

According to yet another embodiment of the present invention, a method of decoding an image by a decoding apparatus. The method comprises the steps of: deriving an intra-prediction mode for a current block; deriving neighboring reference samples of the current block; generating a prediction sample of the current block based on linear interpolation of a first neighboring reference sample located along the prediction direction of the intra-prediction mode, and a second neighboring reference sample located along the opposite direction of the prediction direction, among the neighboring reference samples of the current block, wherein the neighboring reference samples include left neighboring reference samples, upper-left neighboring reference samples, upper neighboring reference samples, right neighboring reference samples, lower-right neighboring reference samples, and lower neighboring reference samples of the current block.

According to yet another embodiment of the present invention, an image decoding apparatus is provided. The decoding apparatus comprises an entropy decoder configured to receive prediction mode information; and a prediction unit configured to derive a prediction mode for a current block based on the prediction mode information, derive neighboring reference samples of the current block, generate a prediction sample of the current block based on linear interpolation of a first neighboring reference sample located along the prediction direction of the intra-prediction mode, and a second neighboring reference sample located along the opposite direction of the prediction direction, among the neighboring reference samples of the current block, wherein the neighboring reference samples include left neighboring reference samples, upper-left neighboring reference samples, upper neighboring reference samples, right neighboring reference samples, lower-right neighboring reference samples, and lower neighboring reference samples of the current block.

According to the present invention, the intra-prediction performance can be improved by efficiently using neighboring samples of a current block.

According to the present invention, it is possible to improve the prediction performance, while reducing the data amount of the additional information.

According to the present invention, the amount of data required for residual information can be reduced and the overall coding efficiency can be increased.

DESCRIPTION OF EXEMPLARY EMBODIMENTS

Figure 1:
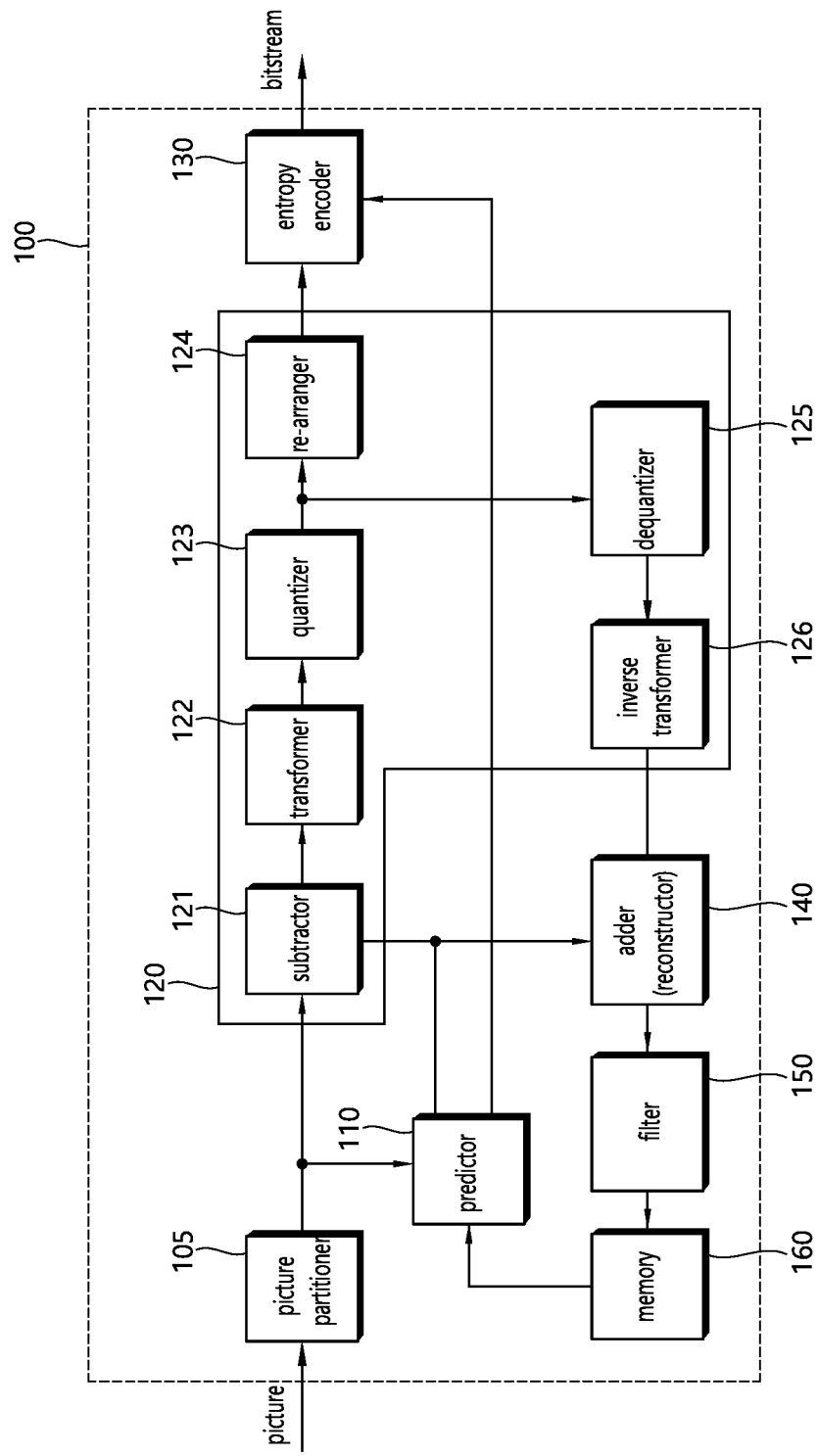
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 may include a picture partitioner 105, a predictor 110, a residual processor 120, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processor.

In an example, the processor may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quad tree structure and/or a binary tree structure. In this case, for example, the quad tree structure may be first applied and the binary tree structure may be applied later. Alternatively, the binary tree structure may be applied first. The coding procedure according to the present invention may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processor may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
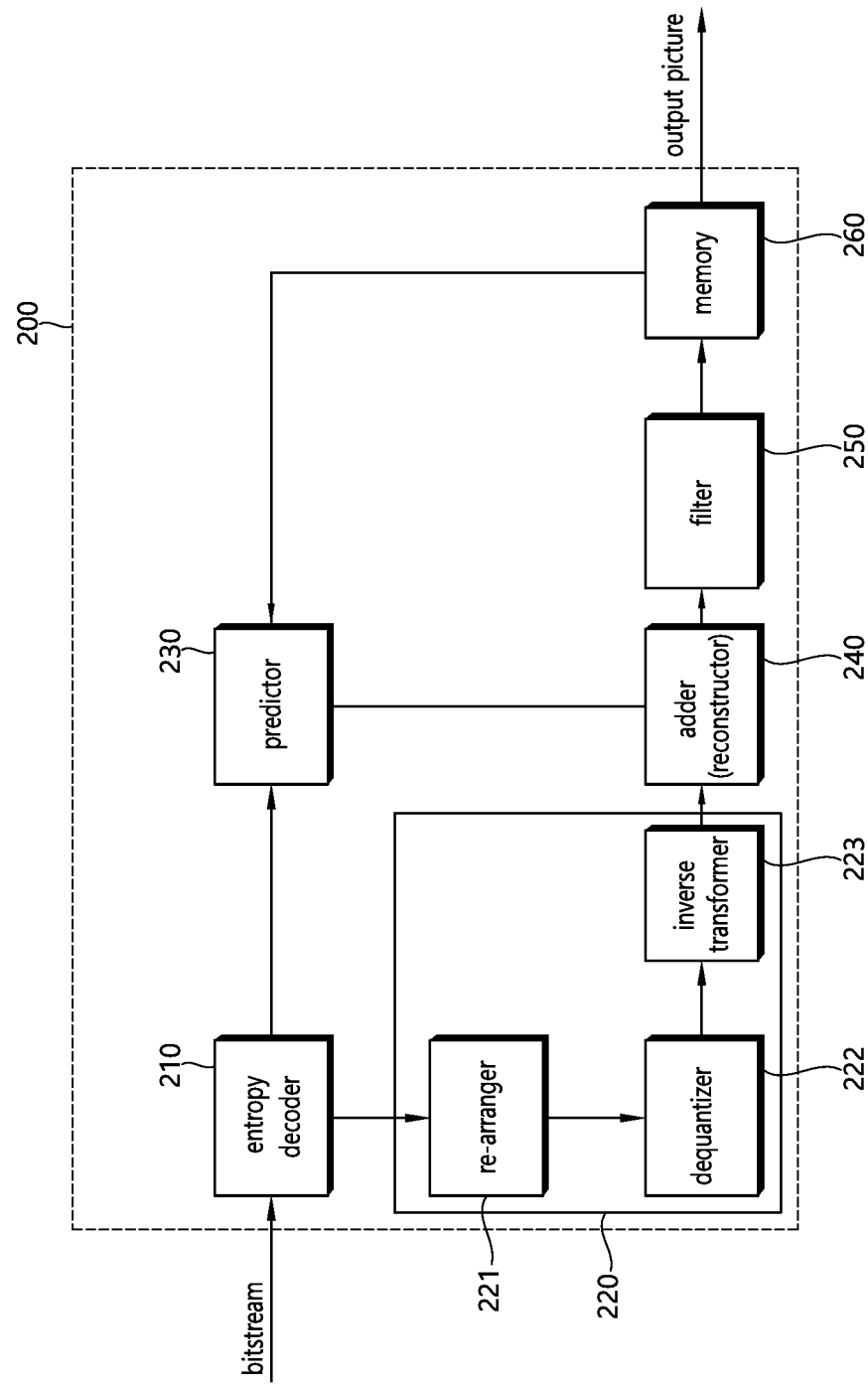
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 may include an entropy decoder 210, a residual processor 220, a predictor 230, an adder 240, a filter 250, and a memory 260. The residual processor 220 may include a re-arranger 221, a dequantizer 222, an inverse transformer 223.

When a bitstream including video information is input, the video decoding device 200 may reconstruct a video in association with a process by which video information is processed in the video encoding device.

For example, the video decoding device 200 may perform video decoding using a processor applied in the video encoding device. Thus, the processor block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding device. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding device.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

When coding is performed on the input picture, the coding may be performed based on one processor. The processor may be represented as a coding unit (CU). Meanwhile, as coding is performed in units of areas including similar information in the picture, transform efficiency may be improved and accordingly overall coding efficiency may be improved. In addition, as coding is performed in units of areas including similar information in the picture, prediction accuracy may be improved and accordingly overall coding efficiency may be improved. However, when only the quad tree (QT) structure is applied and the picture is split into square CUs, there may be a limitation in splitting the picture such that the CUs include only accurately similar information. In this case, the picture may be split into non-square CUs including information representing the specific object to enhance coding efficiency.

Figure 3:
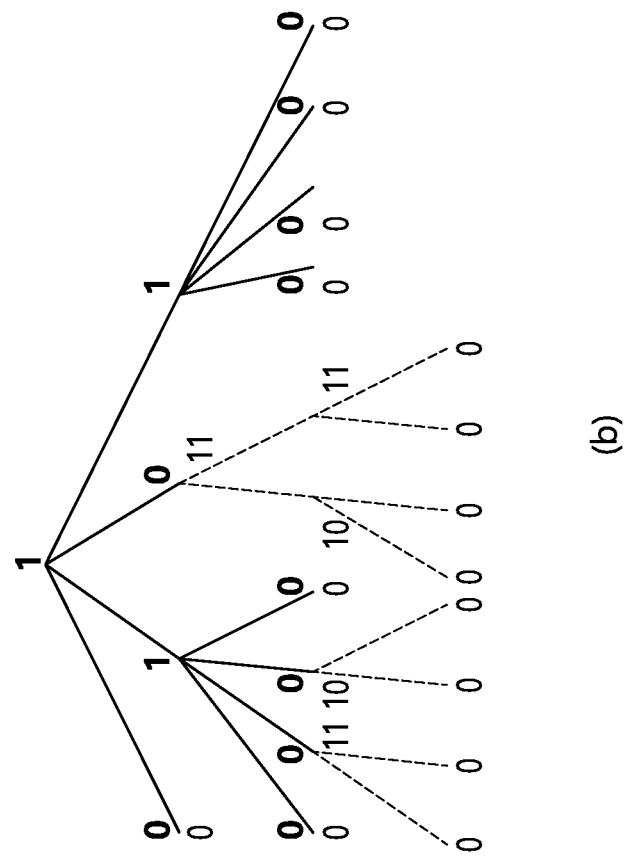
FIG. 3 illustrates a CU split through a quad tree binary tree (QTBT) structure and a signaling method of the QTBT structure.
Figure 3:
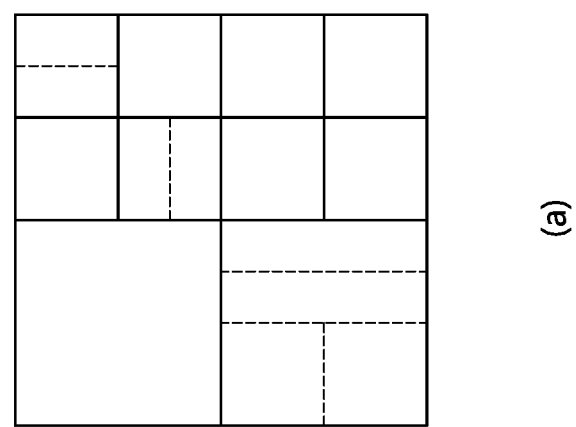

FIG. 3 illustrates a CU split through a quad tree binary tree (QTBT) structure and a signaling method of the QTBT structure.

The QTBT structure may represent a structure in which a CU (or CTU) is split through a QT structure and split through a binary tree (BT) structure. That is, the QTBT may represent a splitting structure configured by combining the QT structure and the BT structure. When a picture is coded in units of CTU, the CTU may be split through the QT structure. A leaf node of the QT structure may be further split through the BT structure. Here, the leaf node may represent a CU which is not split any further in the QT structure, and the leaf node may be called an end node. In addition, the QT structure may represent a structure in which a CU (or CTU) having a 2N×2N size is split into four sub-CUs having a N×N size, and the BT structure may represent a structure in which a CU having a 2N×2N size is split into two sub-CUs having a N×2N (or nL×2N, nR×2N) size or two sub-CUs having a 2N×N (or 2N×nU, 2N×nD) size. Referring to FIG. 3(a), the CU may be split into square CUs of a deeper depth through the QT structure, and a specific CU among the square CUs may be split into non-square CUs of a deeper depth through the BT structure.

FIG. 3(b) illustrates an example of syntax signaling of the QTBT structure. The solid line illustrated in FIG. 3(b) may represent the QT structure and the dotted line may represent the BT structure. Also, from the top to the bottom, the syntax for CUs from a higher depth to a deeper depth may be represented. In addition, the syntax for the upper-left side, the upper-right side, the lower-left side, and the lower-right side CUs in the left-to-right direction may be represented. Specifically, the uppermost number may represent a syntax for a CU of n depth, the numbers at the second position from above may represent a syntax for CUs of n+1 depth, the numbers at the third position from above may represent a syntax for CUs of n+2 depth, and the numbers at the fourth position from above may represent a syntax for CUs of n+3 depth. Also, the numbers in the bold may represent values of syntaxes for the QT structure, and numbers not represented in the bold may represent values of syntaxes for the BT structure.

Referring to FIG. 3(b), a QT split flag indicating whether a CU is split through the QT structure may be transmitted. That is, a flag indicating whether a CU having a 2N×2N size is split into 4 sub-CUs having an N×N size may be transmitted. For example, if the value of the QT split flag for the CU is 1, the CU may be split into 4 sub CUs, and if the value of the QT split flag for the CU is 0, the CU may not be split. In addition, information on a maximum CU size, a minimum CU size, and a maximum depth in the QT structure may be transmitted to adjust the QT structure for the input image. The information on the QT structure described above may be transmitted for each of the slice types or may be transmitted for each of image components (luminance component, saturation component, etc.). Meanwhile, the information about the BT structure may be transmitted to the end node which is not split any further in the QT structure. That is, information on the BT structure for the CU corresponding to the end node in the QT structure may be transmitted. Here, information including the information on the BT structure may be referred to as additional splitting information. For example, a BT split flag indicating whether the CU is split through the BT structure, i.e., whether the BT structure for the CU is applied, may be transmitted. Specifically, when the value of the BT split flag is 1, the CU may be split into two sub-CUs, and when the value of the BT split flag is 0, the CU may not be split. In addition, information on the maximum CU size, the minimum CU size, the maximum depth in the BT structure, and the like, may be transmitted to adjust the BT structure for the input image. The information about the BT structure described above may be transmitted for each of the slice types or may be transmitted for each of the image components. When the CU is split through the BT structure, the CU may be split in a horizontal or vertical direction. A BT split mode index indicating a direction in which the CU is split, i.e., a split type of the CU, may be further transmitted.

Meanwhile, when intra-prediction is performed as described above, a predicted block including prediction samples for a current block may be generated. Here, the predicted block includes prediction samples in a spatial domain (or pixel domain). The predicted block is derived similarly in the encoding device and the decoding device, and the encoding device may signal information (residual information) regarding a residual between the original block and the predicted block, rather than the original sample value of the original block, thus enhancing image coding efficiency. The decoding device may derive a residual block including residual samples based on the residual information and add the residual block and the predicted block to generate a reconstructed block including reconstructed samples and generate a reconstructed picture including the reconstructed block.

Conventionally, a CU is divided only through a quad tree structure, and a PU or TU, which is a processor for performing prediction when intra-prediction is applied, was also divided from a square CU based on a quad tree structure in a square shape. However, according to the present invention, it is possible to derive a non-square CU based on the QTBT structure, and even when intra-prediction is applied, intra-prediction can be performed more suitable for image characteristics based on a non-square block.

Figure 4:
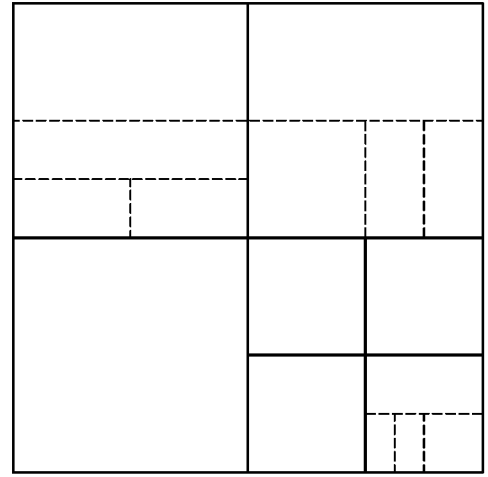
FIG. 4 illustrates an exemplary QT split based architecture and a QTBT split based architecture.
Figure 4:
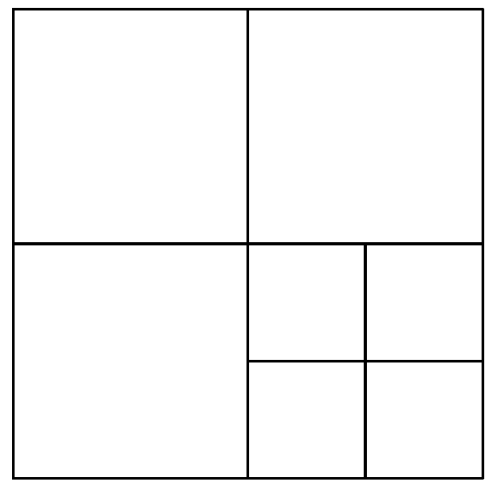

FIG. 4 illustrates an exemplary QT split based architecture and a QTBT split based architecture.

Conventionally, as shown in FIG. 4A, a CU is divided only through a quad tree structure. When intra-prediction is applied, PU or TU, which is a processor for performing prediction, was also divided from a square CU based on a quad tree structure in a square shape and thus the prediction was performed. However, in order to improve the coding efficiency, the CU can be divided through the QTBT structure as shown in FIG. 4 (b), more efficient intra-prediction can be performed considering the image characteristics based on the non-square block, and thus the amount of residual information can be reduced. In FIG. 4B, the blocks separated by a solid line represent a quad tree structure, and the blocks separated by a dotted line represent a binary tree structure. Conventionally, the blocks can be divided only into a quad tree structure as shown by the solid line but, according to the present invention, they can be divided into various non-square shaped blocks as well as square shaped blocks according to the characteristics of the image based on the QTBT structure. That is, in the conventional intra-prediction, prediction was performed in units of a square shaped PU derived from a square shaped CU, and then (residual) transform was performed in units of square shaped TU derived from the square shaped CU. However, for the intra-prediction based on the QTBT structure such as the present invention, the intra-prediction can be performed in the square shaped block as well as the square shaped block, and the prediction and transform can be performed based on the divided blocks without distinguishing the PU and the TU. Also, conventionally, the intra-prediction was performed based only on the left neighboring reference samples, the upper-left neighboring reference sample, and the upper neighboring reference samples of the current block of the current block, and according to the present invention, the intra-prediction can be performed using the right neighboring reference samples, the lower-right neighboring reference sample, and the lower neighboring samples, as well as on the left neighboring reference samples, the upper-left neighboring reference sample, and the upper neighboring reference samples. In this case, the prediction sample can be derived based on the linear interpolation prediction. For example, when one prediction direction is derived according to the intra-directional mode, the predicted value for the target sample can be derived using not only a first neighboring (reference) sample located along the prediction direction from the target sample but also a second neighboring (reference) sample located at the opposite direction to the prediction direction. That is, the predicted sample value for the target sample may be derived based on the first neighboring sample and the second neighboring sample.

Figure 5:
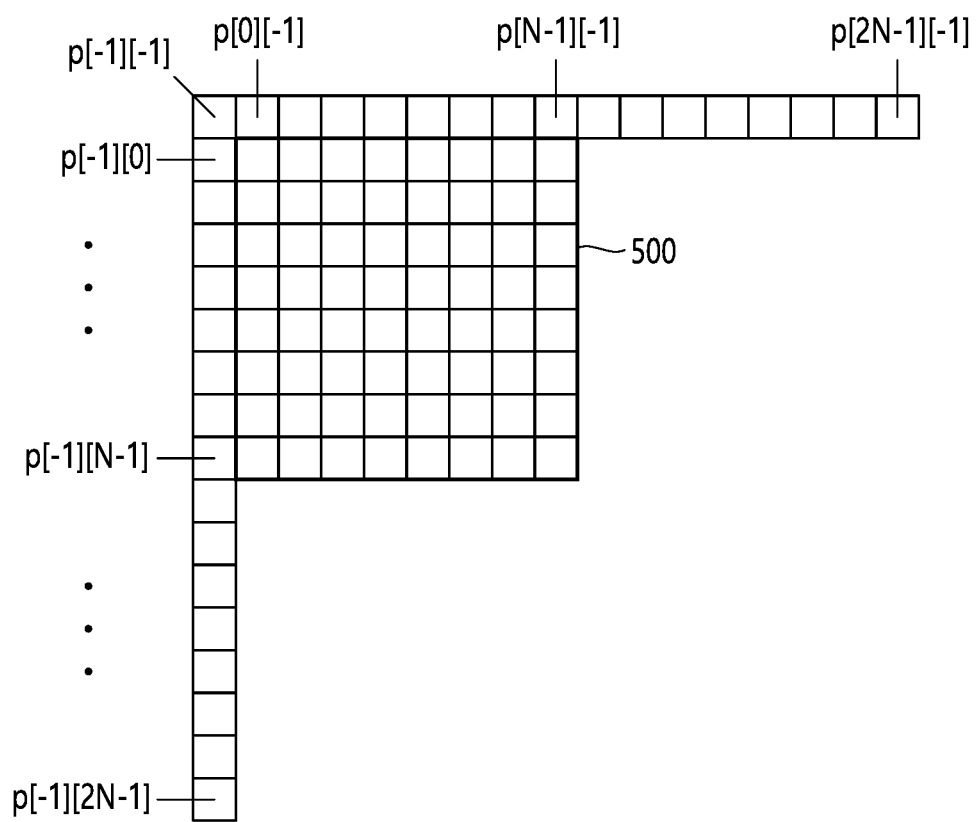
FIG. 5 illustrates an example of the left, upper-left and upper neighboring reference samples that can be used when the intra-prediction is performed on the current block.

FIG. 5 illustrates an example of the left, upper-left and upper neighboring reference samples that can be used when the intra-prediction is performed on the current block.

Referring to FIG. 5, as the neighboring (reference) samples for the intra-prediction of the current block 500, the left neighboring samples (p[−1][2N−1] . . . p[−1][0]), the upper-left neighboring sample (p[−1][−1]), and the upper neighboring samples (p[0][−1] . . . p[2N−1][−1]) can be derived. Here, p[m][n] represents a sample (or pixel) of the sample position (m, n), and it can represent a relative sample position when the top-left side sample position of the current block is regarded as (0, 0). Also, here, N represents the size of the current block 500. The N may correspond to the width or height of the current block 500. FIG. 5 illustrates a case where the width and height of the current block are the same, and when the width and height of the current block are different, the width may be expressed by W and the height may be represented by H, and it will be apparent to those skilled in the art that N used to represent the vertical position of the left neighboring sample in the sample position may be replaced with H, and N used to represent the horizontal position of the upper neighboring sample may be replaced with W. The same goes for the following.

On the other hand, when there is the samples which are not available for the intra-predication among the neighboring samples p[−1][2N−1] . . . p[−1][−1] . . . p[2N−1][−1], the sample which is not available may be filled with the available sample through a substitution or padding procedure. For example, the sample which is not available may be replaced or padded with another neighboring sample adjacent to the corresponding sample.

Here, for example, when the position of the corresponding sample is located outside the picture, the corresponding sample may be a sample which is not available. For example, if the current block 500 is located at the edge of a picture, some of the neighboring samples may not be available. In another example, when another CU including the corresponding sample is not yet coded, the corresponding sample may be the sample which is not available.

The replacement or padding procedure may be performed, for example, in the following order.

1) When the neighboring sample p[−1][2N−1] is not available, a search can be performed sequentially from the neighboring sample p[−1][2N−1] (or the neighboring sample p[−1][2N−2]) to p[−1][−1], and then the search can be performed sequentially from p[0][−1] to p[2N−1][−1], and the value of the available neighboring sample that is found first can be assigned to the neighboring sample p[−1][2N−1].

2) The search is performed sequentially from x=−1, y=2N−2 to x=−1, y=−1, and when p[x][y] is not available, the value of p[x][y+1] is replaced to the value of the unavailable p[x][y].

3) The search is performed sequentially from x=0, y=−1 to x=2N−1, y=−1, and when p[x][y] is not available, the value of p[x−1][y] is replaced to the value of the unavailable p[x][y].

When the intra-prediction is applied, the prediction samples are derived using at least one neighboring sample according to the intra-prediction mode with reference to the current block. In this case, the intra-prediction mode may include, for example, 33 directional (or angular) prediction modes and two non-directional (or non-angular) prediction modes as follows.

TABLE 1

| Intra-prediction mode | Associated name |
| --- | --- |
| 0 | Intra-plannar |
| 1 | Intra-DC |
| 2 . . . 34 | Intra-angular 2 . . . Intra-angular 34 |

Here, the 0-th intra-prediction mode represents the intra-planar mode and the 1-th intra-prediction mode represents the intra-DC mode. The $2^{nd}$ to 34-th intra-prediction modes represents the intra-angular 2 mode to the intra-angular 34 mode.

Herein, the intra-planar mode and the intra-DC mode are non-directional prediction modes, and the intra-angular 2 to intra-angle 34 modes are directional prediction modes.

Figure 6A:
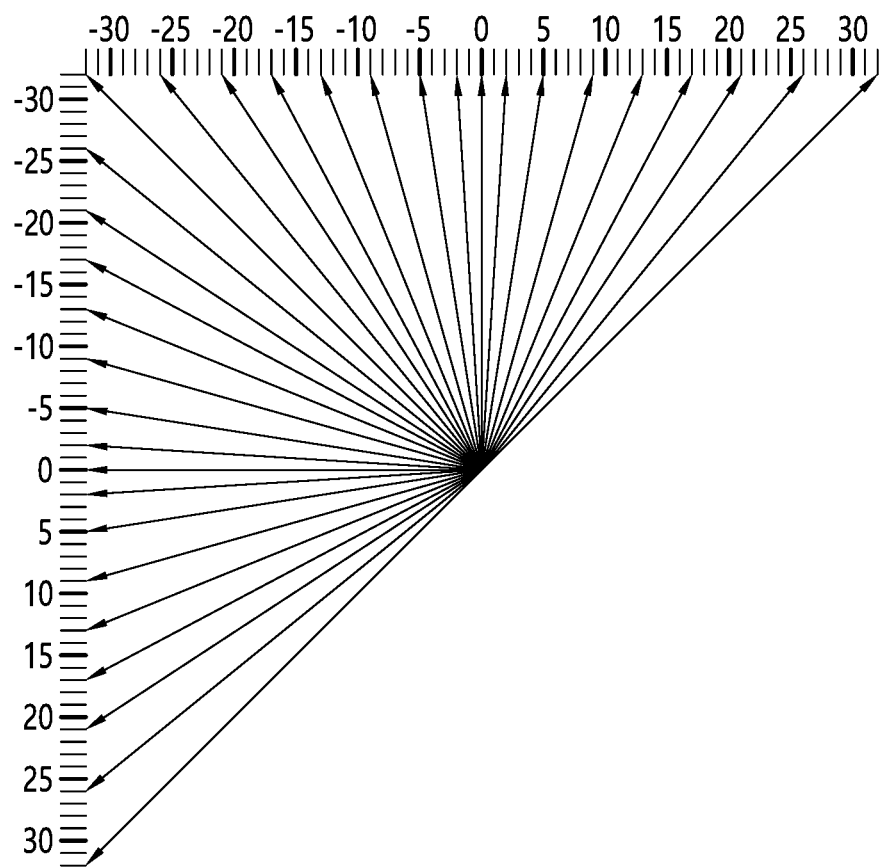
FIGS. 6A and 6B illustrate exemplary intra-prediction modes.
Figure 6B:
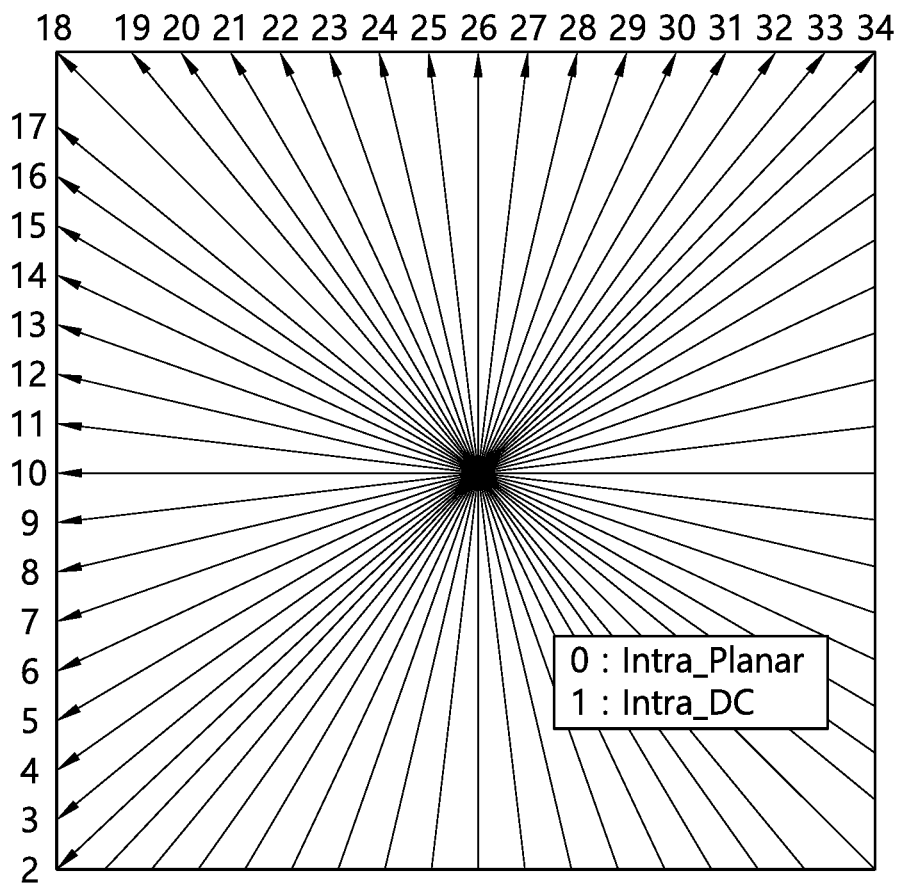

FIGS. 6A and 6B illustrate exemplary intra-prediction modes.

Referring to FIGS. 6A and 6B, the intra-prediction mode having a horizontal directionality and the intra-prediction mode having a vertical directionality can be distinguished with reference to the 18-th intra-prediction mode having an upper-left diagonal prediction direction. The numbers from −32 to 32 in FIG. 6A represents the vertical or horizontal displacement in units of 1/32 on the sample grid position. The $2^{nd}$ to $17^{th}$ intra-prediction modes have a horizontal direction, and the 18th to 34th the intra-prediction modes have a vertical direction. The 10th intra-prediction mode and the 26th intra-prediction mode represent the horizontal intra-prediction mode and the vertical intra-prediction mode, respectively, and based on this, the prediction direction of the directional intra-mode can be expressed in angle. That is, a relative angle corresponding to each intra-prediction mode can be expressed with reference to the horizontal reference angle 0° corresponding to the 10th intra-prediction mode, and a relative angle corresponding to each intra-prediction mode can be expressed with reference to the vertical reference angle 0° corresponding to the 26th intra-prediction mode The $0^{th}$ and $1^{st}$ intra-prediction modes have no directionality, and the prediction sample can be derived based on the bi-directional interpolation of neighboring samples, or the average value of neighboring samples. Meanwhile, the $2^{th}$ to $34^{th}$ intra-prediction modes have the directionality as shown in FIG. 6B, and the prediction samples can be derived using the neighboring reference samples located at the corresponding prediction direction with reference to the position of the prediction sample. In this case, when there is no neighboring sample in units of integer sample at the corresponding prediction direction position, a fractional sample is generated through interpolation of two integer samples adjacent to the corresponding direction position and the prediction sample may be derived based on the fractional sample.

When such intra-prediction is performed, the neighboring reference samples of the current block are simply copied according to the prediction mode (or the prediction direction) to derive the prediction sample, and as the positions of the prediction samples and the positions of the neighboring reference samples become farther away from each other, there is a tendency to increase in error.

However, according to the present invention, such errors can be reduced through linear interpolation prediction. In the linear interpolation prediction, the right neighboring reference samples, the lower-right neighboring reference samples, and the lower neighboring reference samples of the current block are derived, and then the predication samples can be generated by interpolating with the existing reference samples (the left neighboring reference samples, the upper-left neighboring reference sample and the upper neighboring reference sample). As the blocks in a picture are generally coded/decoded in a raster scan order, since the right block, the lower block and the lower-right block are not yet decoded with reference to the current block to be currently decoded, the right neighboring reference samples, the lower-right neighboring reference samples and the lower neighboring reference samples of the current block have not yet been reconstructed, and it is necessary to derive the right neighboring reference samples, the lower-right neighboring reference sample, and the lower neighboring reference samples.

That is, in order to perform linear interpolation intra-prediction, it is necessary to first derive the neighboring reference samples of the current block. In this case, the left neighboring reference samples, the upper-left neighboring reference sample, and the upper neighboring reference samples may use the reconstructed samples at the corresponding locations, and when there is some sample which is not available, the corresponding sample which is not available may be filled with the available sample through a substitution or padding procedure. In this case, for example, the sample which is not available may be replaced or padded with another neighboring reference sample adjacent to the corresponding sample.

On the other hand, since the right neighboring reference samples, the lower-right neighboring reference samples, and the lower neighboring reference samples, among the neighboring reference samples, are located at blocks that have not yet been decoded in the decoding order, there may be no reconstructed samples at corresponding positions, and according to the present invention the right neighboring reference samples, the lower-right neighboring reference sample, and the lower neighboring reference samples can be derived through various methods. For example, the right neighboring reference samples, the lower-right neighboring reference sample, and the lower neighboring reference samples, among the neighboring reference samples may be generated using the previously derived upper neighboring reference samples and the left neighboring reference samples. In this case, the lower-right neighboring reference sample is first derived based on at least one of the upper neighboring reference samples and at least one of the left neighboring reference samples, and the lower neighboring reference samples and the right neighboring reference samples can be derived using the derived lower-right neighboring reference sample, left neighboring reference sample and upper neighboring reference sample. In this case, the lower neighboring reference samples and the right neighboring reference samples can be derived through linear interpolation according to distance. Or, the values of the left neighboring reference samples and the upper neighboring reference samples corresponding to according to the distance of the lower neighboring reference samples and right neighboring reference samples are copied to obtain the values of the lower neighboring reference samples and right neighboring reference samples. As another example, the lower-right neighboring reference sample is first generated using the sample value of an original image, and then the lower neighboring reference samples and right neighboring reference samples can be generated using the neighboring reference sample located at the lower-left corner and the neighboring reference sample located at the upper-right corner of the current block. In this case, the sample value of the original image may be signaled.

Hereinafter, a method of deriving neighboring reference samples for intra-prediction in the current block having a non-square block shape will be described in detail. Specifically, a method of generating the right neighboring reference samples, lower-right neighboring reference samples, and lower neighboring reference samples that have not yet been reconstructed in decoding order will be described. Although the present invention is described with reference to a non-square block shape, the method according to the present invention can be applied in the same or similar manner to enhance the intra-prediction efficiency even when the current block has a square block shape. Hereinafter, the neighboring reference sample may be referred to as a neighboring sample.

First, the lower-right neighboring reference sample of the current block can be generated in the following manner.

Figure 7:
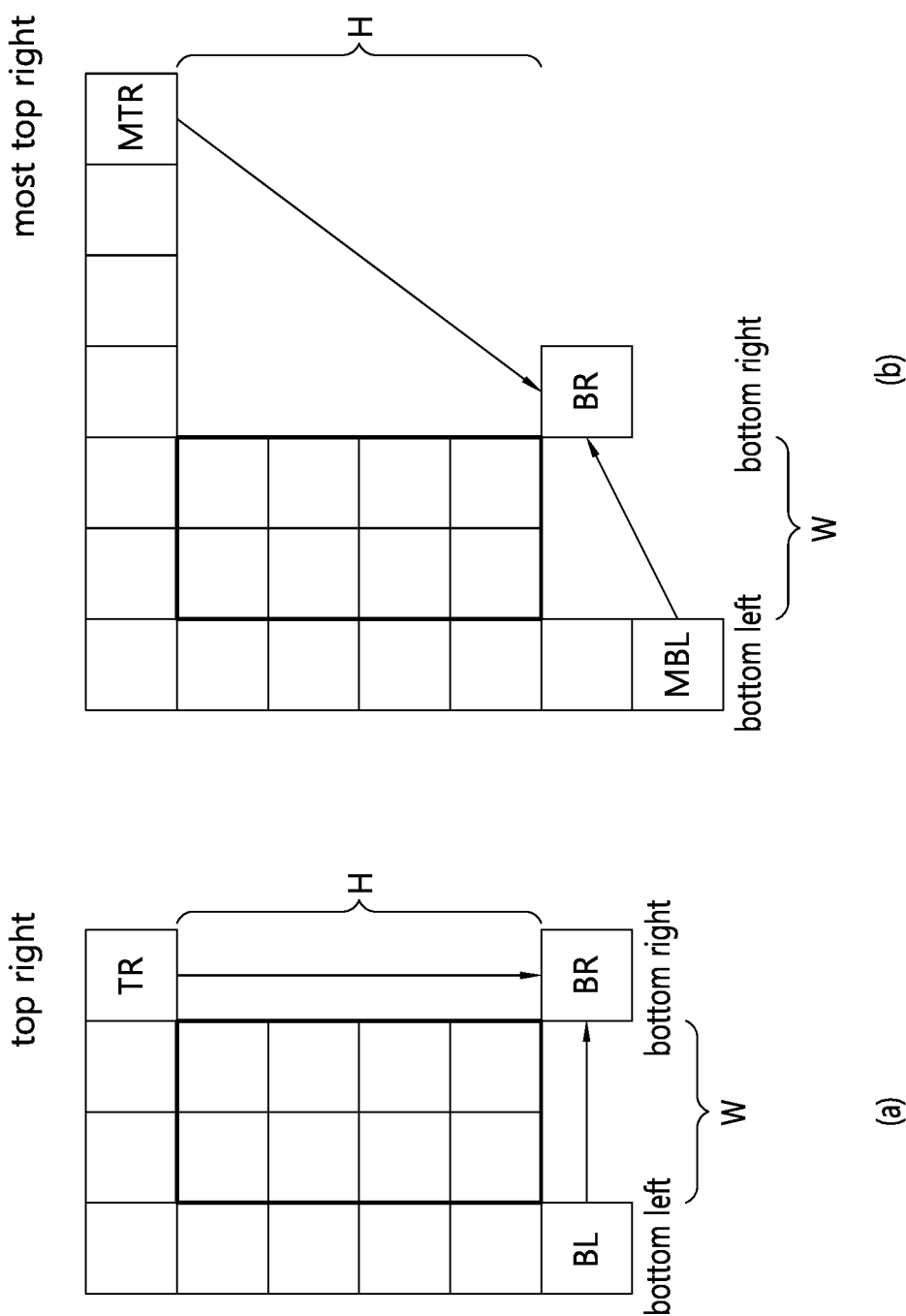
FIG. 7 illustrates an example of a method of generating the lower-right neighboring sample of the current block.

FIG. 7 illustrates an example of a method of generating the lower-right neighboring sample of the current block. Unlike the square shaped blocks, for the non-square shaped blocks, the horizontal lengths and vertical length are different from each other, so this should be taken into account when generating the lower-right neighboring sample.

Referring to FIG. 7(a), the lower-right neighboring sample BR can be generated using the upper-right neighboring sample TR located at the upper-right corner of the current block and the lower-left neighboring sample BL located at the lower-left corner of the current block. For example, when the top-left side sample position of the current block is regarded as (0, 0), the upper-right neighboring sample TR can be represented by p[W][−1], the lower-left neighboring sample BL can be represented by p[−1][H], and the lower-right neighboring sample BR can be represented by p[W][H]. Here, W and H correspond to the width and height of the current block, respectively.

Referring to FIG. 7 (b), the lower-right neighboring sample BR can be generated using a neighboring sample MTR located on the rightmost side, among the upper neighboring samples of the current block and a neighboring sample MBL located at the lowermost side, among the left neighboring samples. For example, the upper neighboring samples and the left neighboring samples may have the number of W+H, respectively, when the top-left side sample position of the current block is regarded as (0, 0), the neighboring sample MTR can be represented as p[W+H][−1], the neighboring sample MBL can be represented as p[−1][H+W] and the lower-right neighboring sample BR can be represented as p[W][H].

The lower-right neighboring sample BR may be derived based on an average value as shown in the following equations, or may be derived based on a distance ratio.

$$BR=(TR+BL+1)>>1 \qquad \text{[Equation 1]}$$

$$BR=(MTR+MBL+1)>>1 \qquad \text{[Equation 2]}$$

$$BR=(W*TR+H*BL+((W+H)>>1))/(W+H) \qquad \text{[Equation 3]}$$

$$BR=(W*MTR+H*MBL+((W+H)>>1))/(W+H) \qquad \text{[Equation 4]}$$

Herein, BR is a lower-right neighboring sample, TR is an upper-right neighboring sample located at an upper-right corner of the current block, BL is a lower-left neighboring sample located at a lower-left corner, among the upper neighboring samples of the current block, MTR is a neighboring sample located at the rightmost side, among the upper neighboring samples of the current block and MBL is a neighboring sample located at the lowermost side, among the left neighboring samples, and W and H correspond to the width and height of the current block, respectively, as described above.

On the other hand, the lower-right neighboring sample of the current block may be derived by signaling a sample value of the original image.

Figure 8:
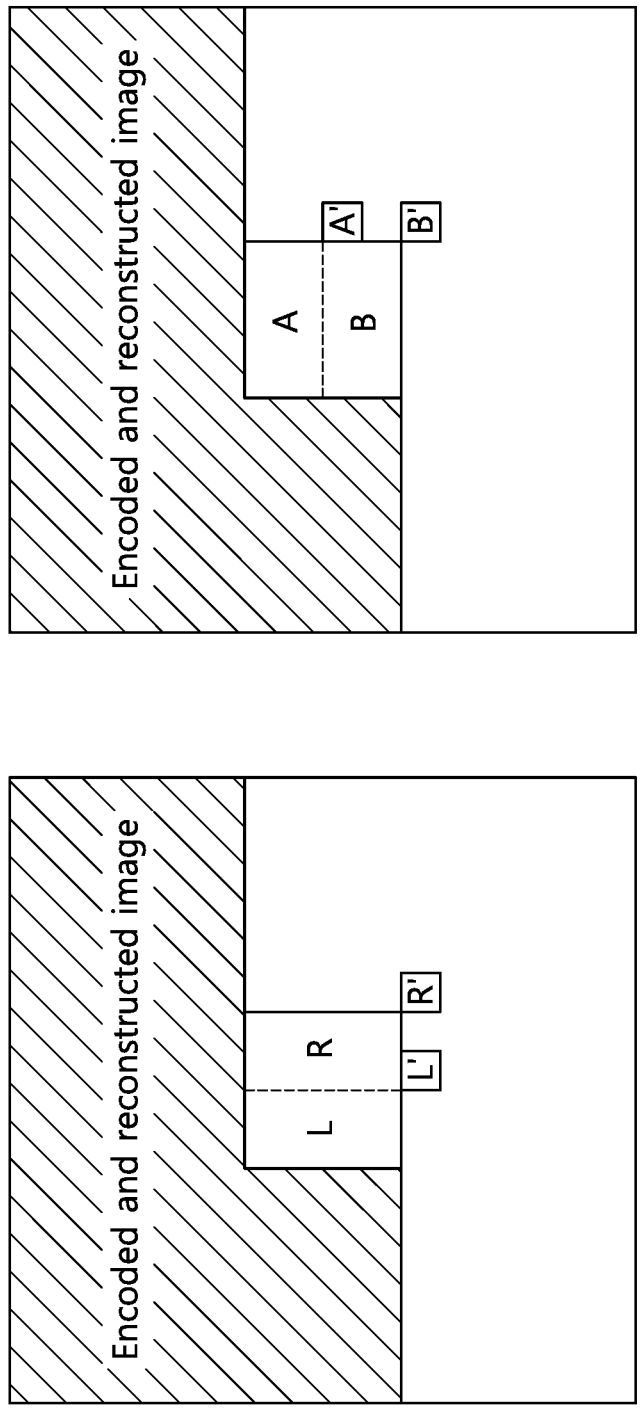
FIG. 8 illustrates another example of a method for generating the lower-right neighboring sample of the current block.

FIG. 8 illustrates another example of a method for generating the lower-right neighboring sample of the current block.

In the embodiment of FIG. 7, the lower-right neighboring sample is derived using the reconstructed samples of the neighboring blocks decoded after encoding already, but according to the present embodiment, the sample values at the positions corresponding to the lower-right neighboring sample in the original image can be directly used as a sample value of the lower-right neighboring sample.

Referring to FIG. 8, the hatched region indicates an image region reconstructed already, and the white region indicates an image region which has not yet reconstructed.

FIG. 8(a) illustrates an example where the current block is a non-square block shape of N×2N, and FIG. 8(b) illustrates an example where the current block is a non-square block shape of 2N×N. The current block may correspond to the block L, R, A, or B. If the current block is block L, the lower-right neighboring sample is sample L', if the current block is block R, the lower-right neighboring sample is sample R', if the current block is block A, the lower-right neighboring sample is sample A', and if the current block is block B, the lower-right side sample is sample B'. That is, in order to encode the L and R blocks in the case of the N×2N type non-square shaped block, the lower-right neighboring sample values of L' and R' can be derived from the original sample values at corresponding positions of the original image. Also, in the case of 2N×N type non-square shaped block, the lower-right neighboring sample values of A' and B' can be derived from corresponding positions of the original image to encode A and B blocks, respectively. In this case, the original sample value at the position corresponding to the lower-right neighboring sample can be directly used as the sample value of the lower-right neighboring sample. As described above, as for generating the lower neighboring samples and the right neighboring samples, the lower-right neighboring sample may be used, and thus the lower-right neighboring sample may have a relatively greater importance than other neighboring samples. Therefore, by using the original sample value for the lower-neighboring samples, it is possible to increase the accuracy of the sample values of the lower-neighboring samples and the lower-right neighboring samples, thereby enhancing the intra-prediction performance. The encoding apparatus can derive the original sample value from the input original picture, and the decoding apparatus can derive the original sample value by being signaled it from the encoding apparatus. That is, the encoding apparatus signals the information on the lower-right neighboring sample value to the decoding apparatus, and the decoding apparatus can derive the lower-right neighboring sample value based on the information. In this case, the information on the lower-right neighboring sample value may include information indicating an absolute value of the original sample corresponding to the lower-neighboring sample, or information on the lower-right neighboring sample value may correspond to the information on the difference and/or the sign with a predetermined reference value. For example, the predetermined reference value may be a median value of the sample value range, or may be an average or median value of the sample values of the left neighboring samples, the upper-left neighboring sample, and the upper neighboring samples which was reconstructed. Specifically for example, in order to efficiently transmit the lower-right neighbor sample value, the following method can be performed. In the block coding order, the original sample value is transmitted for the first lower-right neighboring sample value, and from the following lower-right neighboring sample, the difference value with the lower-right neighboring sample which was just previously transmitted is transmitted and thus the difference value which is actually transmitted can be reduced. Alternatively, a prediction block is first generated according to the existing prediction method using the prediction mode of the current block and then the difference value between the lower-right side sample value P [W−1][H−1] in the prediction block and the lower-right neighboring sample value P [W][H] is transmitted and thus the difference value which is actually transmitted can be reduced. That is, in this case, the lower-right neighboring (predicted) sample value P[W−1][H−1] of the current block is obtained based on the left, upper-left and upper neighboring samples and the intra-prediction mode. The required amount of bits can be reduced by signaling the difference value between the lower-right neighboring (original) sample value P[W][H] and the lower-right neighboring (predicted) sample value P[W−1][H−1].

Meanwhile, in order to perform the intra-linear interpolation prediction according to the present invention, the lower neighboring sample and the right neighboring sample should be generated, as well as the lower-right neighboring sample of the current block. Since the blocks are reconstructed in the raster scanning order as shown in FIG. 8, the lower side, lower-right side and right side blocks of the current block has not yet been reconstructed, at the time of reconstruction of the current block. Therefore, for the linear interpolation prediction according to the present invention, it is necessary to generate the lower neighboring samples and the right neighboring samples. In this case, for example, the lower-right neighboring sample derived according to the above-described method can be used. Specifically, the lower neighboring samples and the right neighboring samples of the non-square current block can be generated using the derived lower-right neighboring samples and the already decoded upper neighboring sample and left neighboring sample.

Figure 9:
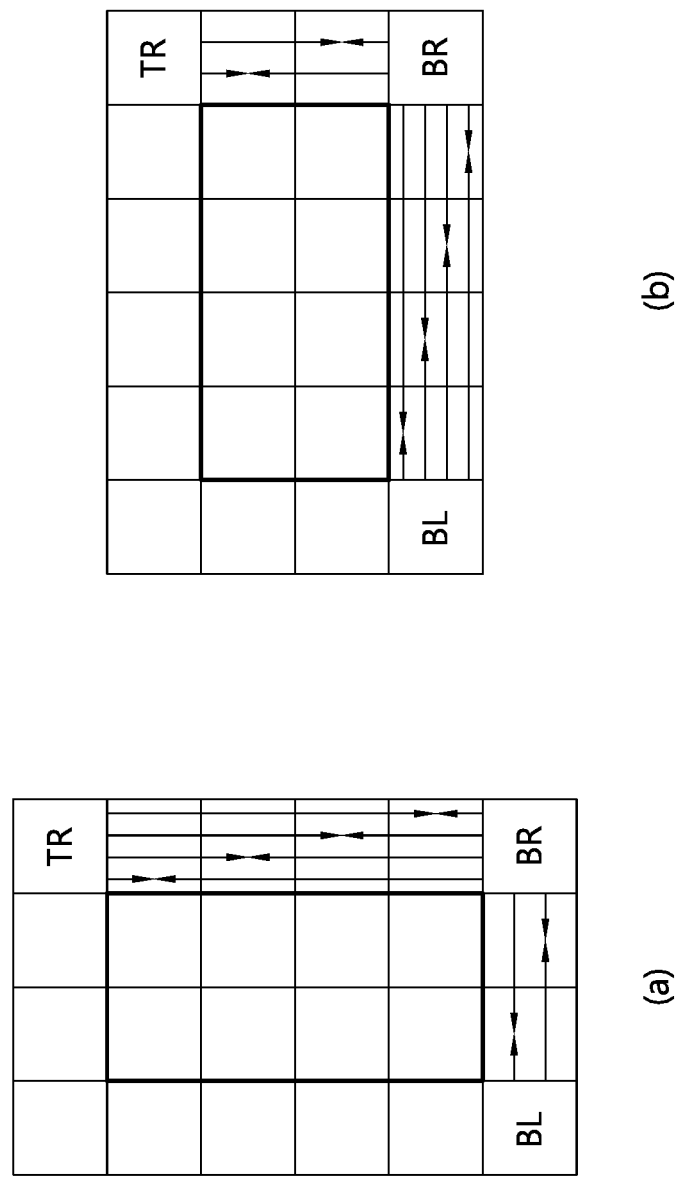
FIG. 9 illustrates an example of a method of generating the lower neighboring samples and the right neighboring samples using the lower-right neighboring sample.

FIG. 9 illustrates an example of a method of generating the lower neighboring samples and the right neighboring samples using the lower-right neighboring sample. FIG. 9(*a*) illustrates an example where the current block is a non-square block shape of N×2N, and FIG. 9(*b*) illustrates an example where the current block is a non-square block shape of 2N×N.

Referring to FIG. 9, the lower neighboring samples can be generated by linearly interpolating the lower-right neighboring sample BR of the current block and the lower-left neighboring sample BL located at the lower-left corner of the current block by distance. Also, the right neighboring samples can be generated by linearly interpolating the lower-right neighboring sample BR of the current block and the upper-right neighboring sample TR located at the upper-right corner of the current block by distance. For example, when the upper-right neighboring sample TR is represented as p[W][−1], the lower-left neighboring sample BL is represented as p[−1][H], and the lower-right neighboring sample BR is represented as p[W][H], the lower neighboring samples are represented as p[0][H] . . . p[W−1][H] and the right neighboring samples are represented as p[W][0] . . . p[W][H−1]. In this case, for example, the lower neighboring sample p[x][H] can be derived based on an interpolation by the distance of the p[−1][H] and the p[W][H] for the corresponding sample position (x, H). Also, for example, the right neighboring sample p[W][y] can be derived based on an interpolation by the distance of the p [W][−1] and the p[W][H] for the corresponding sample position (W, y).

On the other hand, the left neighboring samples and the upper neighboring samples of the current block may be used to generate the lower neighboring samples and the right neighboring samples without using the lower-right neighboring sample of the current block.

Figure 10:
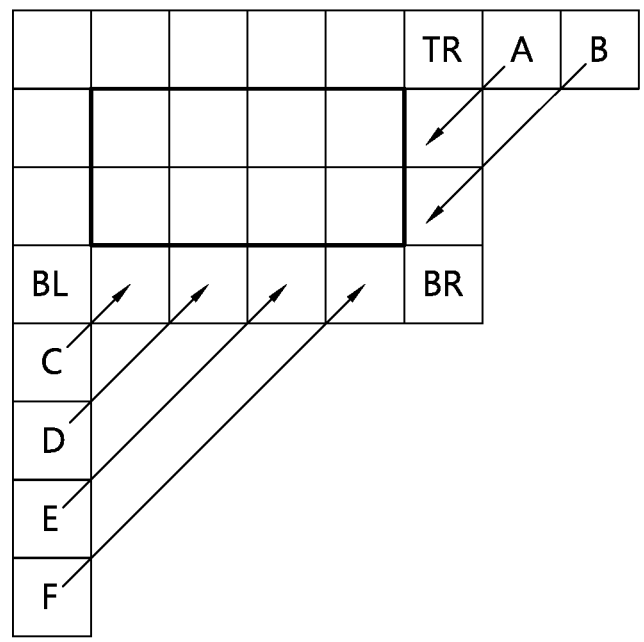
FIG. 10 illustrates another example of a method of generating lower neighboring samples and right neighboring samples of the current block.

FIG. 10 illustrates another example of a method of generating lower neighboring samples and right neighboring samples of the current block.

Referring to FIG. 10, the left neighboring samples and the upper neighboring samples of the current block may be copied without using the lower-right neighboring samples of the current block to generate lower neighboring samples and right neighboring samples. In this case, the upper neighboring samples A and B may be copied to the corresponding lower neighboring samples, and the left neighboring samples C, D, E, and F may be copied to the corresponding lower neighboring samples. In this case, the horizontal distance between the upper neighboring sample A or B and the upper-right neighboring sample TR may be corresponded to the vertical distance between the right neighboring sample and the upper-right neighboring sample TR. That is, in this case, the right neighboring sample p[W][n] can be derived from the upper neighboring sample p[W+n+1][−1]. Here, n is an integer greater than or equal to zero. Specifically, for example, the upper neighboring sample A can be represented by p[W+1][−1], the upper neighboring sample B can be represented by p[W+2][−1], and the right neighboring sample p[W][0] can be derived from the p[W+1][−1], and the right neighboring sample p[W][1] can be derived from the p[W+2][−1]. Also, the vertical distance between the left neighboring sample C, D, E or F and the lower-right neighboring sample BL may be corresponded to the horizontal distance between the lower neighboring sample and the lower-left neighboring sample BL. That is, in this case, the lower neighboring sample p[n][H] can be derived from the left neighboring sample p[−1][H+n+1]. Here, n is an integer greater than or equal to zero. Specifically, for example, the left neighboring sample C can be represented as p[−1][H+1], the left neighboring sample D can be represented as $\overset{!}{=}$ p[−1][H+2], the left neighboring sample E can be represented as p[−1][H+3], and the left neighboring sample F can be represented as p[−1][H+4], the lower neighboring sample p[0][H] can be derived from p[−1][H+1], the lower neighboring sample p[1][H] can be derived from p[−1][H+2], the lower neighboring sample p[2][H] can be derived from p[−1][H+3], and the lower neighboring sample p[3][H] can be derived from p[−1][H+4].

The linear interpolation prediction according to the present invention can be performed using the lower neighboring samples, the lower-right neighboring sample, the right neighboring samples, and the already derived left neighboring samples, upper-left neighboring samples, and upper neighboring samples. For example, when one prediction direction is derived according to the intra-directional mode, the predicted value for the target sample can be derived using not only a first neighboring (reference) sample located at the prediction direction from the target sample but also a second neighboring (reference) sample located at the opposite direction to the prediction direction. That is, the predicted sample value for the target sample can be derived by linearly interpolating the first neighboring sample and the second neighboring sample.

Figure 11:
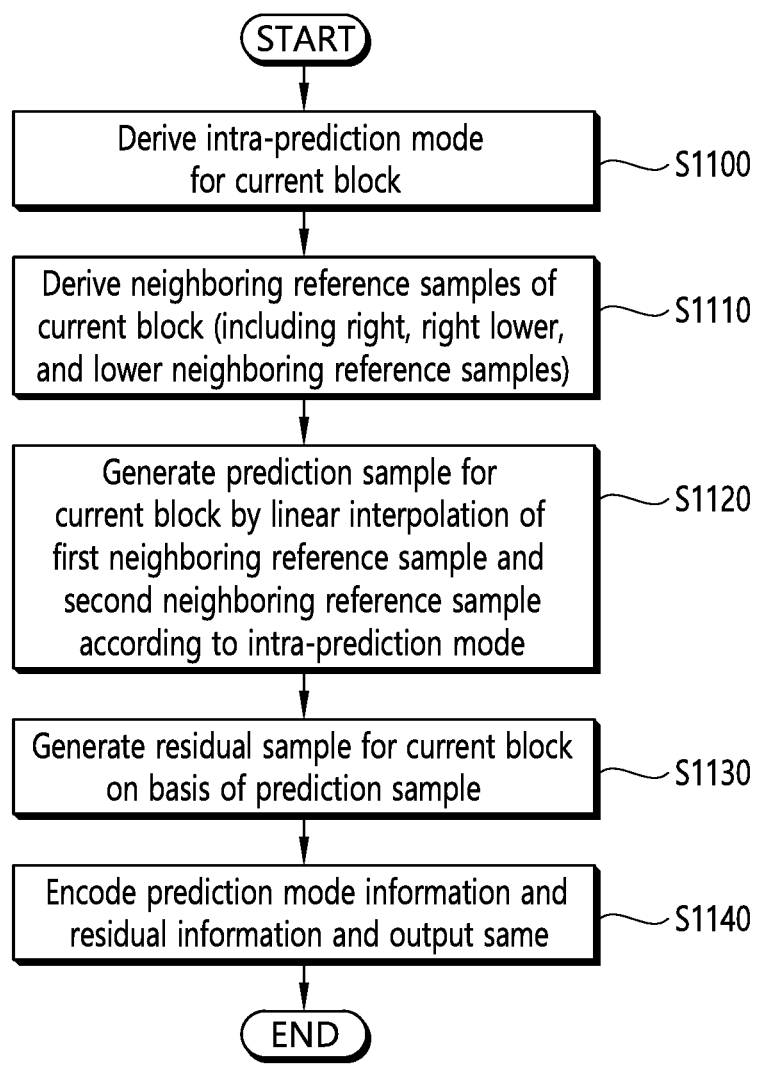
FIG. 11 schematically illustrates an example of an image coding method according to the present invention.

FIG. 11 schematically illustrates an example of an image coding method according to the present invention. The method disclosed in FIG. 11 can be performed by the encoding apparatus disclosed in FIG. 1. Specifically, for example, S1100 to S1120 of FIG. 11 may be performed by the prediction unit of the encoding apparatus, S1130 may be performed by the residual processor of the encoding apparatus, and S1140 may be performed by the entropy encoder of the encoding apparatus.

Referring to FIG. 11, the encoding apparatus derives an intra-prediction mode for a current block (S1100). The encoding apparatus can derive an optimal intra-prediction mode for the current block based on a rate-distortion (RD) cost. The intra-prediction mode may be one of two non-directional prediction modes and more than 34 (e.g., 65) directional prediction modes. As described above, the two non-directional prediction modes may include an intra-DC mode and an intra-planar mode.

The current block may be a non-square block divided according to the QTBT structure.

The encoding apparatus derives the neighboring reference samples of the current block to perform the intra-prediction (S1110). Here, the neighboring reference samples may include left neighboring reference samples, upper-left neighboring reference samples, upper neighboring reference samples, right neighboring reference samples, lower-right neighboring reference samples, and lower neighboring reference samples of the current block.

When the sample size of the current block is WxH and the x component of the top-left side sample position of the current block is 0 and its y component is 0, the lower neighboring reference samples may include p[0][H] to p[W−1][H], the lower-right neighboring reference samples may include p[W][H] and the right neighboring reference samples may include p[W][H−1] to p[W][0].

The left neighboring reference samples, the upper-left neighboring reference sample, and the upper neighboring reference samples may be already reconstructed samples.

When at least one of the left neighboring reference samples, the upper-left neighboring reference sample, and the upper neighboring reference samples is not available, the value of the sample that is not available is substituted or padded through the substitution or padding procedure. Here, when at least one sample position of the left neighboring reference samples, the upper-left neighboring reference sample and the upper neighboring reference samples is located at the outline of the current picture, or neighboring block including at least one sample position of the left neighboring reference samples, the upper-left neighboring reference sample and the upper neighboring reference samples has not yet been decoded, then the at least one sample may be determined to be unavailable.

The lower-right neighboring reference sample can be derived based on the lower-left neighboring reference sample located at a lower-left corner of the current block, among the left neighboring reference samples and the upper-right neighboring reference sample located at an upper-right corner of the current block, among the upper neighboring reference samples.

In one example, the value of the lower-right neighboring reference sample may be derived based on the average of the value of the lower-left neighboring reference sample and the value of the upper-right neighboring reference sample. In this case, the lower-right neighboring reference sample can be derived based on the above-mentioned equation 1.

As another example, the lower-right neighboring reference sample may be derived based on the linear interpolation of the lower-left neighboring reference sample and the upper-right neighboring reference sample. In this case, the lower-right neighboring reference sample can be derived based on the above-mentioned equation 3.

As another example, the lower-right neighboring reference sample may be derived based on a neighboring reference sample located at the lowermost side, among the left neighboring reference samples and a neighboring reference sample located at the rightmost side, among the upper neighboring reference samples. In this case, the lower-right neighboring reference sample may be derived based on the above-mentioned equation 2 or 4.

As another example, the lower-right neighboring reference sample may be derived based on the sample value of the original sample corresponding to the position of the lower-right neighboring sample. In this case, the encoding apparatus can signal the information on the lower-right neighboring sample value.

The encoding apparatus can derive the lower neighboring reference samples through the linear interpolation of the lower-left neighboring reference sample located at the lower-left corner and the lower-right neighboring reference sample of the current block, among the left neighboring reference samples and can derive the right neighboring reference samples through the linear interpolation of the upper-right neighboring reference sample located at the upper-right corner and the lower-right neighboring reference sample of the current block, among the upper neighboring reference samples. When the current block has the width and height of W and H, respectively, and the lower-left neighboring reference sample is p[−1][H] and the upper-right neighboring reference sample is p[W][−1] and the lower-right neighboring reference sample is p[W][H], the lower neighboring reference sample p[x][H] of the lower neighboring reference samples can be derived based on the interpolation according to the distance of the p[−1][H] and the p[W][H] for the corresponding sample position (x, H), and the right neighboring reference sample p[W][y] of the right neighboring reference samples can be derived based on the interpolation according to the distance of the p[W][−1] and the p[W][H] for the corresponding sample position (W, y).

The encoding apparatus can derive the lower neighboring reference samples by copying the neighboring reference samples on the lower side of the lower-left neighboring reference sample located at the lower-left corner of the current block, among the left neighboring reference samples and can derive the right neighboring reference samples by copying the neighboring reference samples on the right side of the upper-right neighboring reference sample located at the upper-right corner of the current block, among the upper neighboring reference samples. When the current block has the width and height of W and H, respectively, and the lower-left neighboring reference sample is p[−1][H], the upper-right neighboring reference sample is p[W][−1] and the lower-right neighboring reference sample is p[W][H], the lower neighboring reference sample p[n][H] among the lower neighboring reference samples can be derived from the left neighboring sample p[−1][H+n+1] and the right neighboring reference sample p[W][n] among the right neighboring reference samples can be derived from the left neighboring sample p[−1][H+n+1].

The encoding apparatus generate a prediction sample for the current block by linearly interpolating a first neighboring reference sample and a second neighboring reference sample according to the intra-prediction mode (S1120).

For example, when the intra-prediction mode for the current block is an intra-directional mode, the prediction sample can be generated based on the first neighboring reference samples located at the prediction direction indicated by the intra-directional mode (i.e., reference sample located at the prediction direction from the prediction sample position) and the second neighboring reference sample located at a direction opposite to the prediction direction. If a neighboring sample of the integer sample unit is not located at the prediction direction, then a fractional sample value may be generated and used for the position indicated by the prediction direction through interpolation of two neighboring reference samples in the integer sample unit adjacent to the position indicated by the prediction direction.

Meanwhile, the intra-prediction mode for the current block may be an intra-DC mode. In this case, one value derived from the left neighboring reference samples, the right neighboring reference samples, the upper neighboring reference samples and the lower neighboring reference samples, among the neighboring reference samples may be derived as the value of the prediction sample.

In addition, the intra-prediction mode for the current block may be an intra-planar mode. In this case, the value of the prediction sample can be derived by using (e.g., bidirectional linear interpolation) two neighboring reference samples located at the same row as the prediction sample and two neighboring reference samples located at the same column as the prediction sample, among the neighboring reference samples.

The encoding apparatus generates a residual sample (or a residual sample array) for the current block based on the derived prediction sample (S1230). The encoding apparatus may generate the residual sample based on the original sample and the prediction sample for the target block of the current picture.

The encoding apparatus encodes prediction mode information on the intra-prediction mode and residual information on the residual sample and outputs the encoded information (S1240). The encoding apparatus can encode the information and output it as a bit stream. The bitstream may be transmitted to a decoding apparatus over a network or a storage medium. The prediction mode information may include information directly indicating an intra-prediction mode of the current block, or may include information indicating any one candidate among an intra-prediction mode candidate list derived based on the intra-prediction mode of a left block or an upper block of the current block. The residual information may include transform coefficients on the residual sample.

In addition, when the lower-right neighboring reference sample is derived based on the sample value of the original sample corresponding to the position of the lower-right neighboring sample, the encoding apparatus may further encode and output information on the lower-right neighboring reference sample. The information on the lower-right neighboring sample value may indicate a sample value of the original sample corresponding to the position of the lower-right neighboring sample.

Figure 12:
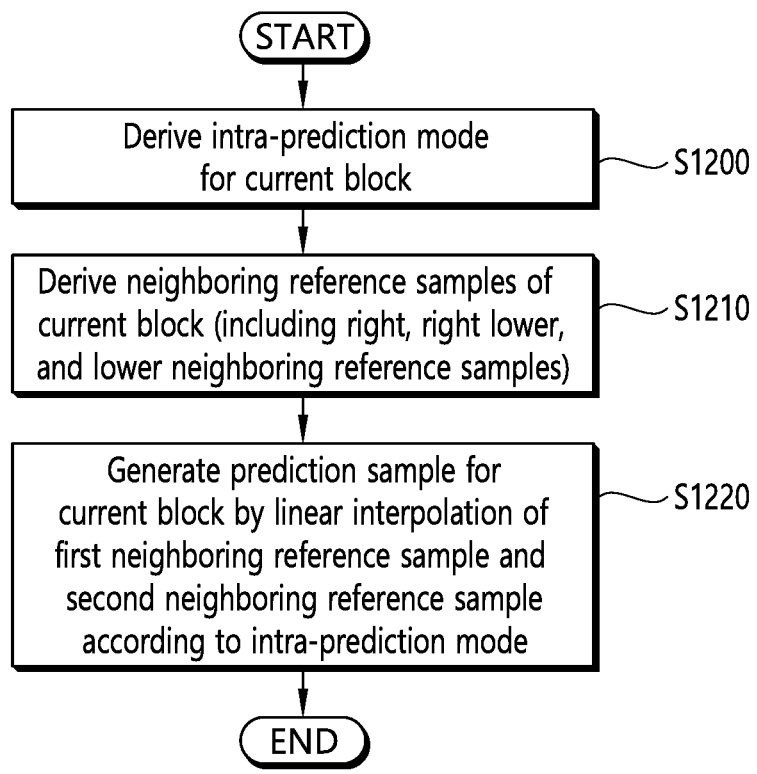
FIG. 12 schematically illustrates an example of an intra-prediction method according to the present invention.

FIG. 12 schematically illustrates an example of an intra-prediction method according to the present invention. The method disclosed in FIG. 12 can be performed by the decoding apparatus disclosed in FIG. 2. Specifically, for example, S1200 to S1220 in FIG. 12 may be performed by the prediction unit of the decoding apparatus.

Referring to FIG. 12, the decoding apparatus derives an intra-prediction mode for a current block (S1200). The decoding apparatus can derive an optimal intra-prediction mode for the current block based on the prediction mode information about the intra-prediction mode obtained through the bitstream. The bitstream may be received from an encoding apparatus over a network or storage medium. The prediction mode information may include information directly indicating an intra-prediction mode of the current block or may include information indicating any one candidate, among an intra-prediction mode candidate list derived based on the intra-prediction mode of a left block or an upper block of the current block.

The current block may be a non-square block divided according to the QTBT structure.

The decoding apparatus derives the neighboring reference samples of the current block to perform the intra-prediction (S1210). Here, the neighboring reference samples may include left neighboring reference samples, upper-left neighboring reference samples, upper neighboring reference samples, right neighboring reference samples, lower-right neighboring reference samples and lower neighboring reference samples of the current block.

If the sample size of the current block is W×H and the x component of the top-left side sample position of the current block is 0 and its y component is 0, then the lower neighboring reference samples may include p[0][H] to p[W−1][H], the lower-right neighboring reference sample may include p[W][H] and the right neighboring reference samples may include p[W][H−1] to p[W][0].

The left neighboring reference samples, the upper-left neighboring reference sample, and the upper neighboring reference samples may be already reconstructed samples.

Meanwhile, when at least one of the left neighboring reference samples, the upper-left neighboring reference sample, and the upper neighboring reference samples is not available, the value of the sample that is not available is substituted or padded through the substitution or padding procedure. Here, when at least one sample position of the left neighboring reference samples, the upper-left neighboring reference sample and the upper neighboring reference samples is located at the outline of the current picture, or neighboring block including at least one sample position of the left neighboring reference samples, the upper-left neighboring reference sample and the upper neighboring reference samples has not yet been decoded, then the at least one sample may be determined to be unavailable.

The lower-right neighboring reference sample can be derived based on the lower-left neighboring reference sample located at a lower-left corner of the current block, among the left neighboring reference samples and the upper-right neighboring reference sample located at an upper-right corner of the current block, among the upper neighboring reference samples.

In one example, the value of the lower-right neighboring reference sample may be derived based on the average of the value of the lower-left neighboring reference sample and the value of the upper-right neighboring reference sample. In this case, the lower-right neighboring reference sample can be derived based on the above-mentioned equation 1.

As another example, the lower-right neighboring reference sample may be derived based on the linear interpolation of the lower-left neighboring reference sample and the upper-right neighboring reference sample. In this case, the lower-right neighboring reference sample can be derived based on the above-mentioned equation 3.

As another example, the lower-right neighboring reference sample may be derived based on a neighboring reference sample located at the lowermost side, among the left neighboring reference samples and a neighboring reference sample located at the rightmost side, among the upper neighboring reference samples. In this case, the lower-right neighboring reference sample may be derived based on the above-mentioned equation 2 or 4.

As another example, the lower-right neighboring reference sample may be derived based on the sample value of the original sample corresponding to the position of the lower-right neighboring sample. In this case, the encoding apparatus can signal the information on the lower-right neighboring sample value.

The decoding apparatus can derive the lower neighboring reference samples through the linear interpolation of the lower-left neighboring reference sample located at the lower-left corner and the lower-right neighboring reference sample of the current block, among the left neighboring reference samples and can derive the right neighboring reference samples through the linear interpolation of the upper-right neighboring reference sample located at the upper-right corner and the lower-right neighboring reference sample of the current block, among the upper neighboring reference samples. When the current block has the width and height of W and H, respectively, and the lower-left neighboring reference sample is p[−1][H] and the upper-left neighboring reference sample is p[W][−1] and the lower-right neighboring reference sample is p[W][H], the lower neighboring reference sample p[x][H] of the lower neighboring reference samples can be derived based on the interpolation according to the distance of the p[−1][H] and the p[W][H] for the corresponding sample position (x, H), and the right neighboring reference sample p[W][y] of the right neighboring reference samples can be derived based on the interpolation according to the distance of the p[W][−1] and the p[W][H] for the corresponding sample position (W, y).

The decoding apparatus can derive the lower neighboring reference samples by copying the neighboring reference samples on the lower side of the lower-left neighboring reference sample located at the lower-left corner of the current block, among the left neighboring reference samples and can derive the right neighboring reference samples by copying the neighboring reference samples on the right side of the upper-right neighboring reference sample located at the upper-right corner of the current block, among the upper neighboring reference samples. When the current block has the width and height of W and H, respectively, and the lower-left neighboring reference sample is p[−1][H], the upper-right neighboring reference sample is p[W][−1] and the lower-right neighboring reference sample is p[W][H], the lower neighboring reference sample p[n][H] among the lower neighboring reference samples can be derived from the left neighboring sample p[−1][H+n+1] and the right neighboring reference sample p[W][n] among the right neighboring reference samples can be derived from the left neighboring sample p[−1][H+n+1].

The decoding apparatus generates a prediction sample for the current block by linearly interpolating a first neighboring reference sample and a second neighboring reference sample according to the intra-prediction mode (S1220).

For example, when the intra-prediction mode for the current block is an intra-directional mode, the prediction sample can be generated based on the first neighboring reference samples located at the prediction direction indicated by the intra-directional mode (i.e., reference sample located at the prediction direction from the prediction sample position) and the second neighboring reference sample located at a direction opposite to the prediction direction. If a neighboring sample of the integer sample unit is not located at the prediction direction, then a fractional sample value may be generated and used for the position indicated by the prediction direction through interpolation of two neighboring reference samples in the integer sample unit adjacent to the position indicated by the prediction direction.

The decoding apparatus may generate the prediction sample based on the linear interpolation of the first and second neighboring samples when the current block is a non-square block. In addition, the decoding apparatus can generate the prediction sample based on the linear interpolation of the first and second neighboring samples even when the current block is a square block.

Meanwhile, the intra-prediction mode for the current block may be an intra-DC mode. In this case, one value derived from the left neighboring reference samples, the right neighboring reference samples, the upper neighboring reference samples and the lower neighboring reference samples, among the neighboring reference samples may be derived as the value of the prediction sample.

In addition, the intra-prediction mode for the current block may be an intra-planar mode. In this case, the value of the prediction sample can be derived by using (e.g., bidirectional linear interpolation) two neighboring reference samples located at the same row as the prediction sample and two neighboring reference samples located at the same column as the prediction sample, among the neighboring reference samples.

Further, the decoding apparatus can further receive information on the lower-lower-right neighboring sample value. Here, the information on the lower-right neighboring sample value indicates a sample value of the original sample corresponding to the position of the lower-right neighboring sample and the decoding apparatus may derive the lower-right neighboring sample based on the information on the lower-right neighboring sample value.

On the other hand, although not shown, the decoding apparatus can receive residual information on the residual sample for the current block from the bitstream. The residual information may include transform coefficients on the residual sample.

The decoding apparatus may derive the residual sample (or residual sample array) for the current block based on the residual information. The decoding apparatus may generate a reconstructed sample based on the prediction sample and the residual sample, and may derive a reconstructed block or a reconstructed picture based on the reconstructed sample. Hereinafter, as described above, the decoding apparatus can apply an in-loop filtering procedure such as deblocking filtering and/or SAO procedure to the reconstructed picture in order to improve subjective/objective picture quality as necessary.

The above-described method according to the present invention can be implemented in software, and the encoding apparatus and/or decoding apparatus according to the present invention can be included in an apparatus performing image processing, such as a television, a computer, a smart phone, a set-top box, display apparatus, and so on.

When the embodiments of the present invention are implemented in software, the above-described method may be implemented by a module (a process, a function, and the like) that performs the functions described above. The module is stored in memory and can be executed by the processor. The memory may be internal or external to the processor and may be coupled to the processor by way of a variety of well-known means. The processor may comprise an application-specific integrated circuit (ASIC), other chipset, logic circuitry and/or a data processing device. The memory may include read-only memory (ROM), random access memory (RAM), flash memory, memory cards, storage media, and/or other storage devices.

What is claimed is:

1. An intra-prediction method performed by a decoding apparatus, the method comprising:
   deriving an intra-prediction mode of a current block;
   deriving neighboring reference samples of the current block; and
   generating a prediction sample of the current block based on a linear interpolation of a first neighboring reference sample located along a prediction direction of the intra-prediction mode and a second neighboring reference sample located along an opposite direction with regard to the prediction direction, among the neighboring reference samples of the current block,
   wherein the neighboring reference samples include left neighboring reference samples, an upper-left neighboring reference sample, upper neighboring reference samples, right neighboring reference samples, a lower-right neighboring reference sample and lower neighboring reference samples of the current block,
   wherein the lower neighboring reference samples is derived through a linear interpolation of a lower-left neighboring reference sample located at a lower-left corner of the current block and the lower-right neighboring reference sample, among the left neighboring reference samples, and wherein the right neighboring reference samples is derived through a linear interpolation of an upper-right neighboring reference sample located at an upper-right corner of the current block and the lower-right neighboring reference sample, among the upper neighboring reference samples, and
   wherein when the current block has a width and a height of W and H, respectively, and the lower-left neighboring reference sample is p[−1][H] and the upper-right neighboring reference sample is p[W][H], the lower neighboring reference sample p[x][H] among the lower neighboring reference samples is derived based on an interpolation along the distance of the p[−1][H] and the p[W][H] with regard to the sample position (x, H), and the right neighboring reference sample p[W][y] among the right neighboring reference samples is derived based on an interpolation along the distance of the p[W][−1] and the p[W][H] with regard to the sample position (W, y).

2. The intra-prediction method according to claim 1, wherein the prediction sample is generated based on the linear interpolation of the first neighboring reference sample and the second first neighboring reference sample when the current block is a non-square block.

3. The intra-prediction method according to claim 1, wherein the lower-right neighboring reference sample is derived based on a lower-left neighboring reference sample located at a lower-left corner of the current block, among the left neighboring reference samples and an upper-right neighboring reference sample located at an upper-right corner of the current block, among the upper neighboring reference samples.

4. The intra-prediction method according to claim 3, wherein the lower-right neighboring reference sample is derived based on the following equation, $$BR=(TR+BL+1)>>1,$$

and wherein BR represents the lower-right neighboring reference sample, TR represents the upper-right neighboring reference sample, and BL represents the lower-left neighboring reference sample.

5. The intra-prediction method according to claim 3, wherein the lower-right neighboring reference sample is derived based on the following equation, $$BR=(W*TR+H*BL+((W+H)>>1))/(W+H),$$

and wherein BR represents the lower-right neighboring reference sample, TR represents the upper-right neighboring reference sample, and BL represents the lower-left neighboring reference sample.

6. The intra-prediction method according to claim 1, wherein the lower-right neighboring reference sample is derived based on the neighboring reference sample located at the lowermost side among the left neighboring reference samples and the neighboring reference sample located at the rightmost side among the upper neighboring reference samples.

7. The intra-prediction method according to claim 6, wherein the lower-right neighboring reference sample is derived based on the following equation, $$BR=(MTR+MBL+1)>>1,$$

and wherein BR represents the lower-right neighboring reference sample, MTR represents the neighboring reference sample located at the rightmost side among the upper neighboring reference samples, and MBL represents the neighboring reference sample located at the lowest side among the left neighboring reference samples.

8. The intra-prediction method according to claim 6, wherein the lower-right neighboring reference sample is derived based on the following equation, $$BR=(W*MTR+H*MBL+((W+H)>>1))/(W+H),$$

and wherein BR represents the lower-right neighboring reference sample, MTR represents the neighboring reference sample located at the rightmost side among the upper neighboring reference samples, and MBL represents the neighboring reference sample located at the lowest side among the left neighboring reference samples.

9. The intra-prediction method according to claim 1, further comprising receiving information on the lower-right neighboring sample value, and
wherein the lower-right neighboring reference sample is derived based on the information on the lower-right neighboring sample value, and
wherein the information on the lower-right neighboring sample value represents a sample value of an original sample corresponding to the position of the lower-right neighboring sample.

10. An image decoding apparatus, comprising:
an entropy decoder configured to receive prediction mode information of a current block;
a prediction unit configured to: derive an intra-prediction mode of the current block based on the current block information, derive neighboring reference samples of the current block, and generate prediction sample of the current block based on a linear interpolation of a first neighboring reference sample located along a prediction direction of the intra-prediction mode and a second neighboring reference sample located along an opposite direction with regard to the prediction direction, among the neighboring reference samples of the current block,
wherein the neighboring reference samples include left neighboring reference samples, an upper-left neighboring reference sample, upper neighboring reference samples, right neighboring reference samples, a lower-right neighboring reference sample and lower neighboring reference samples of the current block,
wherein the lower neighboring reference samples is derived through a linear interpolation of a lower-left neighboring reference sample located at a lower-left corner of the current block and the lower-right neighboring reference sample, among the left neighboring reference samples, and wherein the right neighboring reference samples is derived through a linear interpolation of an upper-right neighboring reference sample located at an upper-right corner of the current block and the lower-right neighboring reference sample, among the upper neighboring reference samples, and
wherein when the current block has a width and a height of W and H, respectively, and the lower-left neighboring reference sample is p[−1][H] and the upper-right neighboring reference sample is p[W][H], the lower neighboring reference sample p[x][H] among the lower neighboring reference samples is derived based on an interpolation along the distance of the p[−1][H] and the p[W][H] with regard to the sample position (x, H), and the right neighboring reference sample p[W][y] among the right neighboring reference samples is derived based on an interpolation along the distance of the p[W][−1] and the p[W][H] with regard to the sample position (W, y).

11. The image decoding apparatus according to claim 10, wherein the prediction unit generates prediction sample based on the linear interpolation of the first neighboring reference sample and the second first neighboring reference sample when the current block is a non-square block.

12. The image decoding apparatus according to claim 10, wherein the lower-right neighboring reference sample is derived based on a lower-left neighboring reference sample located at a lower-left corner of the current block, among the left neighboring reference samples and an upper-right neighboring reference sample located at an upper-right corner of the current block, among the upper neighboring reference samples.

13. The image decoding apparatus according to claim 10, wherein the lower-right neighboring reference sample is derived based on the following equation, $$BR=(TR+BL+1)>>1,$$

and wherein BR represents the lower-right neighboring reference sample, TR represents the upper-right neighboring reference sample, and BL represents the lower-left neighboring reference sample.

14. The image decoding apparatus according to claim 10, wherein the lower-right neighboring reference sample is derived based on the following equation, $$BR=(W*TR+H*BL+((W+H)>>1))/(W+H),$$

and wherein BR represents the lower-right neighboring reference sample, TR represents the upper-right neighboring reference sample, and BL represents the lower-left neighboring reference sample.

15. The image decoding apparatus according to claim 10, wherein the lower-right neighboring reference sample is derived based on the neighboring reference sample located at the lowermost side among the left neighboring reference samples and the neighboring reference sample located at the rightmost side among the upper neighboring reference samples.

16. The image decoding apparatus according to claim 10, wherein the lower-right neighboring reference sample is derived based on the following equation, $$BR=(MTR+MBL+1)>>1,$$

and wherein BR represents the lower-right neighboring reference sample, MTR represents the neighboring reference sample located at the rightmost side among the upper neighboring reference samples, and MBL represents the neighboring reference sample located at the lowest side among the left neighboring reference samples.

17. The image decoding apparatus according to claim 10, wherein the lower-right neighboring reference sample is derived based on the following equation, $$BR=(W*MTR+H*MBL+((W+H)>>1))/(W+H),$$

and wherein BR represents the lower-right neighboring reference sample, MTR represents the neighboring reference sample located at the rightmost side among the upper neighboring reference samples, and MBL represents the neighboring reference sample located at the lowest side among the left neighboring reference samples.

\* \* \* \* \*